(12) United States Patent
Jozwiak

(10) Patent No.: US 10,058,228 B2
(45) Date of Patent: *Aug. 28, 2018

(54) SOIL CHOPPING SYSTEM FOR A DISHWASHER

(71) Applicant: Whirlpool Corporation, Benton Harbor, MI (US)

(72) Inventor: Todd M. Jozwiak, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/089,753

(22) Filed: Apr. 4, 2016

(65) Prior Publication Data

US 2016/0213220 A1    Jul. 28, 2016

Related U.S. Application Data

(63) Continuation of application No. 13/405,385, filed on Feb. 27, 2012, now Pat. No. 9,301,667.

(51) Int. Cl.
| | |
|---|---|
| *A47L 15/42* | (2006.01) |
| *A47L 15/22* | (2006.01) |
| *B01D 33/067* | (2006.01) |
| *B01D 33/073* | (2006.01) |
| *B01D 33/06* | (2006.01) |

(52) U.S. Cl.
CPC .......... *A47L 15/4227* (2013.01); *A47L 15/22* (2013.01); *A47L 15/4206* (2013.01); *A47L 15/4208* (2013.01); *A47L 15/4219* (2013.01); *B01D 33/067* (2013.01); *B01D 33/073* (2013.01); *B01D 2033/07* (2013.01)

(58) Field of Classification Search
CPC ............. A47L 15/4206; A47L 15/4208; A47L 15/4227; A47L 15/4219; A47L 15/22
See application file for complete search history.

(56) References Cited

U.S. PATENT DOCUMENTS

| | | |
|---|---|---|
| 1,617,021 A | 2/1927 | Mitchell |
| 2,044,524 A | 6/1936 | Caise |
| 2,154,559 A | 4/1939 | Bilde |

(Continued)

FOREIGN PATENT DOCUMENTS

| | | |
|---|---|---|
| CH | 169630 | 6/1934 |
| CN | 2571812 | 9/2003 |

(Continued)

OTHER PUBLICATIONS

Ishihara et al., JP 11155792 A, English Machine Translation, 1999, pp. 1-14.

(Continued)

*Primary Examiner* — Joseph L Perrin
*Assistant Examiner* — Irina Graf
(74) *Attorney, Agent, or Firm* — McGarry Bair PC

(57) ABSTRACT

A dishwasher with a tub at least partially defining a treating chamber, a liquid spraying system supplying a spray of liquid to the treating chamber, a liquid recirculation system defining a recirculation flow path, and a liquid filtering system having a rotating filter. A chopping system is included to macerate foreign objects within the recirculation flow path and includes a blade mounted to the rotating filter.

20 Claims, 7 Drawing Sheets

(56) References Cited

U.S. PATENT DOCUMENTS

| | | |
|---|---|---|
| 2,422,022 A | 6/1947 | Koertge |
| 2,726,666 A | 12/1955 | Oxford |
| 2,734,122 A | 2/1956 | Flannery |
| 3,016,147 A | 1/1962 | Cobb et al. |
| 3,026,628 A | 3/1962 | Berger, Sr. et al. |
| 3,064,664 A | 11/1962 | Warhus |
| 3,068,877 A | 12/1962 | Jacobs |
| 3,103,227 A | 9/1963 | Long |
| 3,122,148 A | 2/1964 | Alabaster |
| 3,186,417 A | 6/1965 | Fay |
| 3,288,154 A | 11/1966 | Jacobs |
| 3,310,243 A | 3/1967 | Duncan |
| 3,378,933 A | 4/1968 | Jenkins |
| 3,542,594 A | 11/1970 | Smith et al. |
| 3,575,185 A | 4/1971 | Barbulesco |
| 3,586,011 A | 6/1971 | Lamberto |
| 3,708,120 A | 1/1973 | Capron |
| 3,709,236 A | 1/1973 | Field |
| 3,739,145 A | 6/1973 | Woehler |
| 3,801,280 A | 4/1974 | Shah et al. |
| 3,846,321 A | 11/1974 | Strange |
| 3,906,967 A | 9/1975 | Bergeson |
| 3,989,054 A | 11/1976 | Mercer |
| 4,179,307 A | 12/1979 | Cau et al. |
| 4,180,095 A | 12/1979 | Woolley et al. |
| 4,228,962 A | 10/1980 | Dingler et al. |
| 4,326,552 A | 4/1982 | Bleckmann |
| 4,346,723 A | 8/1982 | Geiger |
| 4,359,250 A | 11/1982 | Jenkins |
| 4,374,443 A | 2/1983 | Mosell |
| 4,528,097 A | 7/1985 | Ward |
| 4,754,770 A | 7/1988 | Fornasari |
| 5,002,890 A | 3/1991 | Morrison |
| 5,030,357 A | 7/1991 | Lowe |
| 5,131,419 A | 7/1992 | Roberts |
| 5,133,863 A | 7/1992 | Zander |
| 5,331,986 A | 7/1994 | Lim et al. |
| 5,427,129 A | 6/1995 | Hobday |
| 5,454,298 A | 10/1995 | Lu |
| 5,470,142 A | 11/1995 | Sargeant et al. |
| 5,470,472 A | 11/1995 | Baird et al. |
| 5,546,968 A | 8/1996 | Jeon |
| 5,557,704 A | 9/1996 | Dennis et al. |
| 5,569,383 A | 10/1996 | Vander Ark, Jr. et al. |
| 5,601,100 A | 2/1997 | Kato |
| 5,618,424 A | 4/1997 | Nagaoka |
| 5,630,437 A | 5/1997 | Dries et al. |
| 5,655,556 A | 8/1997 | Munini |
| 5,673,714 A | 10/1997 | Munini |
| 5,711,325 A | 1/1998 | Klass et al. |
| 5,755,244 A | 5/1998 | Sargeant et al. |
| 5,782,112 A | 7/1998 | White et al. |
| 5,803,100 A | 9/1998 | Thies |
| 5,865,997 A | 2/1999 | Isaacs |
| 5,868,937 A | 2/1999 | Back et al. |
| 5,904,163 A | 5/1999 | Inoue et al. |
| 5,924,432 A | 7/1999 | Thies et al. |
| 6,053,185 A | 4/2000 | Beevers |
| 6,289,908 B1 | 9/2001 | Kelsey |
| 6,389,908 B1 | 5/2002 | Chevalier et al. |
| 6,443,091 B1 | 9/2002 | Matte |
| 6,460,555 B1 | 10/2002 | Tuller et al. |
| 6,491,049 B1 | 12/2002 | Tuller et al. |
| 6,601,593 B2 | 8/2003 | Deiss et al. |
| 6,666,976 B2 | 12/2003 | Benenson, Jr. et al. |
| 6,675,437 B1 | 1/2004 | York |
| 6,800,197 B1 | 10/2004 | Kosola et al. |
| 6,997,195 B2 | 2/2006 | Durazzani et al. |
| 7,047,986 B2 | 5/2006 | Ertle et al. |
| 7,069,181 B2 | 6/2006 | Jerg et al. |
| 7,093,604 B2 | 8/2006 | Jung et al. |
| 7,150,284 B2 | 12/2006 | Reinhoudt |
| 7,153,817 B2 | 12/2006 | Binder |
| 7,198,054 B2 | 4/2007 | Welch |
| 7,208,080 B2 | 4/2007 | Batten et al. |
| 7,232,494 B2 | 6/2007 | Rappette |
| 7,250,174 B2 | 7/2007 | Lee et al. |
| 7,270,132 B2 | 9/2007 | Inui et al. |
| 7,319,841 B2 | 1/2008 | Bateman, III et al. |
| 7,326,338 B2 | 2/2008 | Batten et al. |
| 7,331,356 B2 | 2/2008 | Thies |
| 7,347,212 B2 | 3/2008 | Rosenbauer |
| 7,350,527 B2 | 4/2008 | Gurubatham et al. |
| 7,363,093 B2 | 4/2008 | King et al. |
| 7,406,843 B2 | 8/2008 | Thies et al. |
| 7,409,962 B2 | 8/2008 | Welch |
| 7,445,013 B2 | 11/2008 | VanderRoest et al. |
| 7,475,696 B2 | 1/2009 | Vanderroest |
| 7,497,222 B2 | 3/2009 | Edwards et al. |
| 7,523,758 B2 | 4/2009 | VanderRoest et al. |
| 7,594,513 B2 | 9/2009 | VanderRoest et al. |
| 7,810,512 B2 | 10/2010 | Pyo |
| 7,819,983 B2 | 10/2010 | Kim et al. |
| 7,896,977 B2 | 3/2011 | Gillum et al. |
| 8,038,802 B1 | 10/2011 | Tuller |
| 8,043,437 B1 | 10/2011 | Delgado et al. |
| 8,137,479 B2 | 3/2012 | Thies |
| 8,161,986 B2 | 4/2012 | Alessandrelli |
| 8,187,390 B2 | 5/2012 | Thies |
| 8,215,322 B2 | 7/2012 | Fountain et al. |
| 8,627,832 B2 | 1/2014 | Fountain et al. |
| 8,667,974 B2 | 3/2014 | Fountain et al. |
| 8,746,261 B2 | 6/2014 | Welch |
| 9,005,369 B2 | 4/2015 | Delgado et al. |
| 9,010,344 B2 | 4/2015 | Welch |
| 9,034,112 B2 | 5/2015 | Tuller et al. |
| 9,301,667 B2 * | 4/2016 | Jozwiak ............ A47L 15/4206 |
| 9,538,898 B2 | 1/2017 | Welch |
| 2002/0017483 A1 | 2/2002 | Chesner et al. |
| 2003/0037809 A1 | 2/2003 | Favaro |
| 2003/0168087 A1 | 9/2003 | Inui et al. |
| 2003/0205248 A1 | 11/2003 | Christman et al. |
| 2004/0007253 A1 | 1/2004 | Jung et al. |
| 2004/0103926 A1 | 6/2004 | Ha |
| 2004/0254654 A1 | 12/2004 | Donnelly et al. |
| 2005/0022849 A1 | 2/2005 | Park et al. |
| 2005/0133070 A1 | 6/2005 | Vanderroest et al. |
| 2006/0005863 A1 | 1/2006 | Gurubatham et al. |
| 2006/0042657 A1 | 3/2006 | Welch |
| 2006/0054549 A1 | 3/2006 | Schoendorfer |
| 2006/0123563 A1 | 6/2006 | Raney et al. |
| 2006/0162744 A1 | 7/2006 | Walkden |
| 2006/0174915 A1 | 8/2006 | Hedstrom et al. |
| 2006/0236556 A1 | 10/2006 | Ferguson et al. |
| 2006/0237049 A1 | 10/2006 | Weaver et al. |
| 2006/0237052 A1 | 10/2006 | Picardat et al. |
| 2007/0006898 A1 | 1/2007 | Lee |
| 2007/0107753 A1 | 5/2007 | Jerg |
| 2007/0119478 A1 | 5/2007 | King et al. |
| 2007/0124004 A1 | 5/2007 | King et al. |
| 2007/0163626 A1 | 7/2007 | Klein |
| 2007/0186964 A1 | 8/2007 | Mason et al. |
| 2007/0246078 A1 | 10/2007 | Purtilo et al. |
| 2007/0266587 A1 | 11/2007 | Bringewatt et al. |
| 2007/0295360 A1 | 12/2007 | Jerg et al. |
| 2008/0116135 A1 | 5/2008 | Rieger et al. |
| 2008/0190464 A1 | 8/2008 | Forst |
| 2008/0289654 A1 | 11/2008 | Kim et al. |
| 2008/0289664 A1 | 11/2008 | Rockwell et al. |
| 2009/0095330 A1 | 4/2009 | Iwanaga et al. |
| 2009/0101182 A1 | 4/2009 | Groll |
| 2009/0283111 A1 | 11/2009 | Classen et al. |
| 2010/0012159 A1 | 1/2010 | Verma et al. |
| 2010/0043826 A1 | 2/2010 | Bertsch et al. |
| 2010/0043828 A1 | 2/2010 | Choi et al. |
| 2010/0043847 A1 | 2/2010 | Yoon et al. |
| 2010/0121497 A1 | 5/2010 | Heisele et al. |
| 2010/0147339 A1 | 6/2010 | Bertsch et al. |
| 2010/0154830 A1 | 6/2010 | Lau et al. |
| 2010/0154841 A1 | 6/2010 | Fountain et al. |
| 2010/0175762 A1 | 7/2010 | Anacrelico |
| 2010/0224223 A1 | 9/2010 | Kehl et al. |
| 2010/0252081 A1 | 10/2010 | Classen et al. |
| 2010/0300499 A1 | 12/2010 | Han et al. |

(56) References Cited

U.S. PATENT DOCUMENTS

| | | |
|---|---|---|
| 2011/0030742 A1 | 2/2011 | Dalsing |
| 2011/0061682 A1 | 3/2011 | Fountain et al. |
| 2011/0120508 A1 | 5/2011 | Yoon et al. |
| 2011/0126865 A1 | 6/2011 | Yoon et al. |
| 2011/0146714 A1 | 6/2011 | Fountain et al. |
| 2011/0146730 A1 | 6/2011 | Welch |
| 2011/0146731 A1 | 6/2011 | Fountain et al. |
| 2011/0197933 A1 | 8/2011 | Yoon et al. |
| 2011/0214702 A1 | 9/2011 | McQueen |
| 2011/0240070 A1 | 10/2011 | Fadler |
| 2012/0097200 A1 | 4/2012 | Fountain |
| 2012/0118330 A1 | 5/2012 | Tuller et al. |
| 2012/0118336 A1 | 5/2012 | Welch |
| 2012/0138096 A1 | 6/2012 | Tuller et al. |
| 2012/0138106 A1 | 6/2012 | Fountain et al. |
| 2012/0138107 A1 | 6/2012 | Fountain et al. |
| 2012/0167928 A1 | 7/2012 | Fountain et al. |
| 2012/0291805 A1 | 11/2012 | Tuller et al. |
| 2012/0291822 A1 | 11/2012 | Tuller et al. |
| 2012/0318295 A1 | 12/2012 | Delgado et al. |
| 2012/0318296 A1 | 12/2012 | Fountain et al. |
| 2012/0318308 A1 | 12/2012 | Fountain et al. |
| 2012/0318309 A1 | 12/2012 | Tuller et al. |
| 2013/0186437 A1 | 7/2013 | Tuller et al. |
| 2013/0186438 A1 | 7/2013 | Fountain et al. |
| 2013/0220386 A1 | 8/2013 | Jozwiak |
| 2013/0319481 A1 | 12/2013 | Welch |
| 2013/0319482 A1 | 12/2013 | Vallejo Noriega et al. |
| 2013/0319483 A1 | 12/2013 | Welch |
| 2013/0319485 A1 | 12/2013 | Blanchard et al. |
| 2014/0109938 A1 | 4/2014 | Geda et al. |
| 2014/0130829 A1 | 5/2014 | Fountain et al. |
| 2014/0230852 A1 | 8/2014 | Welch |
| 2014/0238446 A1 | 8/2014 | Welch |
| 2014/0332040 A1 | 11/2014 | Geda |

FOREIGN PATENT DOCUMENTS

| | | |
|---|---|---|
| CN | 2761660 | 3/2006 |
| CN | 1966129 | 5/2007 |
| CN | 2907830 | 6/2007 |
| CN | 101406379 | 4/2009 |
| CN | 201276653 | 7/2009 |
| CN | 201361486 | 12/2009 |
| CN | 101654855 | 2/2010 |
| CN | 201410325 | 2/2010 |
| CN | 201473770 | 5/2010 |
| DE | 1134489 | 8/1961 |
| DE | 1428358 A1 | 11/1968 |
| DE | 1453070 | 3/1969 |
| DE | 7105474 | 8/1971 |
| DE | 7237309 U | 9/1973 |
| DE | 2825242 A1 | 1/1979 |
| DE | 3337369 A1 | 4/1985 |
| DE | 3723721 A1 | 5/1988 |
| DE | 3842997 A1 | 7/1990 |
| DE | 4011834 A1 | 10/1991 |
| DE | 4016915 A1 | 11/1991 |
| DE | 4131914 A1 | 4/1993 |
| DE | 4236931 A1 | 5/1993 |
| DE | 9415486 U1 | 11/1994 |
| DE | 9416710 U1 | 1/1995 |
| DE | 4413432 C1 | 8/1995 |
| DE | 4418523 A1 | 11/1995 |
| DE | 4433842 | 3/1996 |
| DE | 69111365 T2 | 3/1996 |
| DE | 19546965 A1 | 6/1997 |
| DE | 69403957 T2 | 1/1998 |
| DE | 19652235 | 6/1998 |
| DE | 10000772 A1 | 7/2000 |
| DE | 69605965 T2 | 8/2000 |
| DE | 19951838 A1 | 5/2001 |
| DE | 10065571 A1 | 7/2002 |
| DE | 10106514 A1 | 8/2002 |
| DE | 60206490 T2 | 5/2006 |
| DE | 60302143 | 8/2006 |
| DE | 102005023428 A1 | 11/2006 |
| DE | 102005038433 A1 | 2/2007 |
| DE | 102007007133 A1 | 8/2008 |
| DE | 102007060195 A1 | 6/2009 |
| DE | 202010006739 U1 | 8/2010 |
| DE | 102009027910 A1 | 1/2011 |
| DE | 102009028278 A1 | 2/2011 |
| DE | 102010061215 A1 | 6/2011 |
| DE | 102011052846 A1 | 5/2012 |
| DE | 102010061346 A1 | 6/2012 |
| DE | 102012103435 A1 | 12/2012 |
| EP | 0068974 A1 | 1/1983 |
| EP | 0178202 A1 | 4/1986 |
| EP | 0198496 A1 | 10/1986 |
| EP | 0208900 A2 | 1/1987 |
| EP | 0370552 A1 | 5/1990 |
| EP | 0374616 A1 | 6/1990 |
| EP | 0383028 A2 | 8/1990 |
| EP | 0405627 A1 | 1/1991 |
| EP | 437189 A1 | 7/1991 |
| EP | 3454640 A1 | 10/1991 |
| EP | 0521815 A1 | 1/1993 |
| EP | 0524102 A1 | 1/1993 |
| EP | 0585905 A2 | 9/1993 |
| EP | 0702928 A1 | 8/1995 |
| EP | 0597907 B1 | 12/1995 |
| EP | 0725182 A1 | 8/1996 |
| EP | 0748607 A2 | 12/1996 |
| EP | 752231 A1 | 1/1997 |
| EP | 0752231 A1 | 1/1997 |
| EP | 0854311 A2 | 7/1998 |
| EP | 0855165 A2 | 7/1998 |
| EP | 0898928 A1 | 3/1999 |
| EP | 0943281 A2 | 9/1999 |
| EP | 1029965 A1 | 8/2000 |
| EP | 1224902 A2 | 7/2002 |
| EP | 1256308 A2 | 11/2002 |
| EP | 1264570 | 12/2002 |
| EP | 1277430 A1 | 1/2003 |
| EP | 1319360 A1 | 6/2003 |
| EP | 1342827 | 9/2003 |
| EP | 1346680 A2 | 9/2003 |
| EP | 1386576 A1 | 2/2004 |
| EP | 1415587 | 5/2004 |
| EP | 1498065 A1 | 1/2005 |
| EP | 1583455 A1 | 10/2005 |
| EP | 1703834 A1 | 9/2006 |
| EP | 1728913 A2 | 12/2006 |
| EP | 1743871 A1 | 1/2007 |
| EP | 1862104 A1 | 12/2007 |
| EP | 1882436 A1 | 1/2008 |
| EP | 1980193 A1 | 10/2008 |
| EP | 2127587 A1 | 2/2009 |
| EP | 2075366 A1 | 7/2009 |
| EP | 2138087 A1 | 12/2009 |
| EP | 2332457 A1 | 6/2011 |
| EP | 2335547 a | 6/2011 |
| EP | 2338400 A1 | 6/2011 |
| EP | 2351507 A1 | 8/2011 |
| FR | 1370521 A | 8/1964 |
| FR | 2372363 A1 | 6/1978 |
| FR | 2491320 A1 | 4/1982 |
| FR | 2491321 A1 | 4/1982 |
| FR | 2790013 A1 | 8/2000 |
| GB | 973859 A | 10/1964 |
| GB | 1047948 | 11/1966 |
| GB | 1123789 A | 8/1968 |
| GB | 1515095 | 6/1978 |
| GB | 2274772 A | 8/1994 |
| JP | 55039215 A | 3/1980 |
| JP | 60069375 A | 4/1985 |
| JP | 61085991 A | 5/1986 |
| JP | 61200824 A | 9/1986 |
| JP | 1005521 A | 1/1989 |
| JP | 1080331 A | 3/1989 |
| JP | 5184514 A2 | 7/1993 |
| JP | 5245094 A | 9/1993 |
| JP | 07178030 | 7/1995 |

(56) References Cited

FOREIGN PATENT DOCUMENTS

| | | |
|---|---|---|
| JP | 9164107 A2 | 6/1997 |
| JP | 10109007 A | 4/1998 |
| JP | 10243910 A2 | 9/1998 |
| JP | 11076127 A2 | 3/1999 |
| JP | 2000107114 A | 4/2000 |
| JP | 2001190479 A | 7/2001 |
| JP | 2001190480 A | 7/2001 |
| JP | 2003336909 A | 12/2003 |
| JP | 2003339607 A | 12/2003 |
| JP | 2004113683 A2 | 4/2004 |
| JP | 2004267507 A | 9/2004 |
| JP | 2005124979 A | 5/2005 |
| JP | 2006075635 A | 3/2006 |
| JP | 2007068601 A | 3/2007 |
| JP | 2008093196 A | 4/2008 |
| JP | 2008253543 A | 10/2008 |
| JP | 2008264018 A | 11/2008 |
| JP | 2008264724 A | 11/2008 |
| JP | 2010035745 A | 2/2010 |
| JP | 2010187796 A | 9/2010 |
| KR | 20010077128 | 8/2001 |
| KR | 20060029567 A | 4/2006 |
| KR | 20090006659 | 1/2009 |
| KR | 20090061479 A | 6/2009 |
| KR | 20100037453 A | 4/2010 |
| WO | 2005058124 A1 | 6/2005 |
| WO | 2005060813 A1 | 7/2005 |
| WO | 2005115216 A1 | 12/2005 |
| WO | 2007024491 A2 | 3/2007 |
| WO | 2007074024 A1 | 7/2007 |
| WO | 2008067898 A1 | 6/2008 |
| WO | 2008125482 A2 | 10/2008 |
| WO | 2009018903 A1 | 2/2009 |
| WO | 2009065696 A1 | 5/2009 |
| WO | 2009077266 A1 | 6/2009 |
| WO | 2009077279 A2 | 6/2009 |
| WO | 2009077280 A1 | 6/2009 |
| WO | 2009077283 A1 | 6/2009 |
| WO | 2009077286 A1 | 6/2009 |
| WO | 2009077290 A1 | 6/2009 |
| WO | 2009118308 A1 | 10/2009 |
| WO | 2010073185 A1 | 7/2010 |

OTHER PUBLICATIONS

German Search Report for Counterpart DE102014101260.7, dated Sep. 18, 2014.
German Search Report for DE102013103625, dated Jul. 19, 2013.
German Search Report for Counterpart DE102013109125, dated Dec. 9, 2013.
German Search Report for DE102010061342, dated Aug. 19, 2011.
European Search Report for EP101952380, dated May 19, 2011.
German Search Report for DE1020141017242, dated Apr. 26, 2016.
European Search Report for EP121914675, dated Dec. 5, 2012.
European Search Report for EP11188106, dated Mar. 29, 2012.
European Search Report for EP12188007, dated Aug. 6, 2013.
German Search Report for DE102010061347, dated Jan. 23, 2013.
German Search Report for DE102010061215, dated Feb. 7, 2013.
German Search Report for DE102010061346, dated Sep. 30, 2011.
German Search Report for DE102010061343, dated Jul. 7, 2011.
German Search Report for DE102011053666, dated Oct. 21, 2011.
German Search Report for DE102013103264, dated Jul. 12, 2013.

* cited by examiner

SOIL CHOPPING SYSTEM FOR A DISHWASHER

CROSS REFERENCE TO RELATED APPLICATIONS

This application is a continuation of U.S. patent application Ser. No. 13/405,385, filed Feb. 27, 2012, now U.S. Pat. No. 9,301,667, which is hereby incorporated by reference in its entirety.

BACKGROUND OF THE INVENTION

A dishwasher is a domestic appliance into which dishes and other cooking and eating wares (e.g., plates, bowls, glasses, flatware, pots, pans, bowls, etc.) are placed to be washed. The dishwasher may include a filter system to remove soils from liquid circulated onto the dishes and may include a chopper or other mechanism to macerate foreign objects entrained in the liquid.

BRIEF DESCRIPTION OF THE INVENTION

In one embodiment, a dishwasher for treating dishes according to at least one cycle of operation includes a tub at least partially defining a treating chamber, a liquid spraying system, a liquid recirculation system, a liquid filtering system, with a rotating filter to effect a filtering of the sprayed liquid and a soil chopping system comprising at least one blade mounted to the rotating filter for co-rotation therewith and defining a blade path upon rotation of the rotating filter.

DESCRIPTION OF EMBODIMENTS OF THE INVENTION

Figure 1:
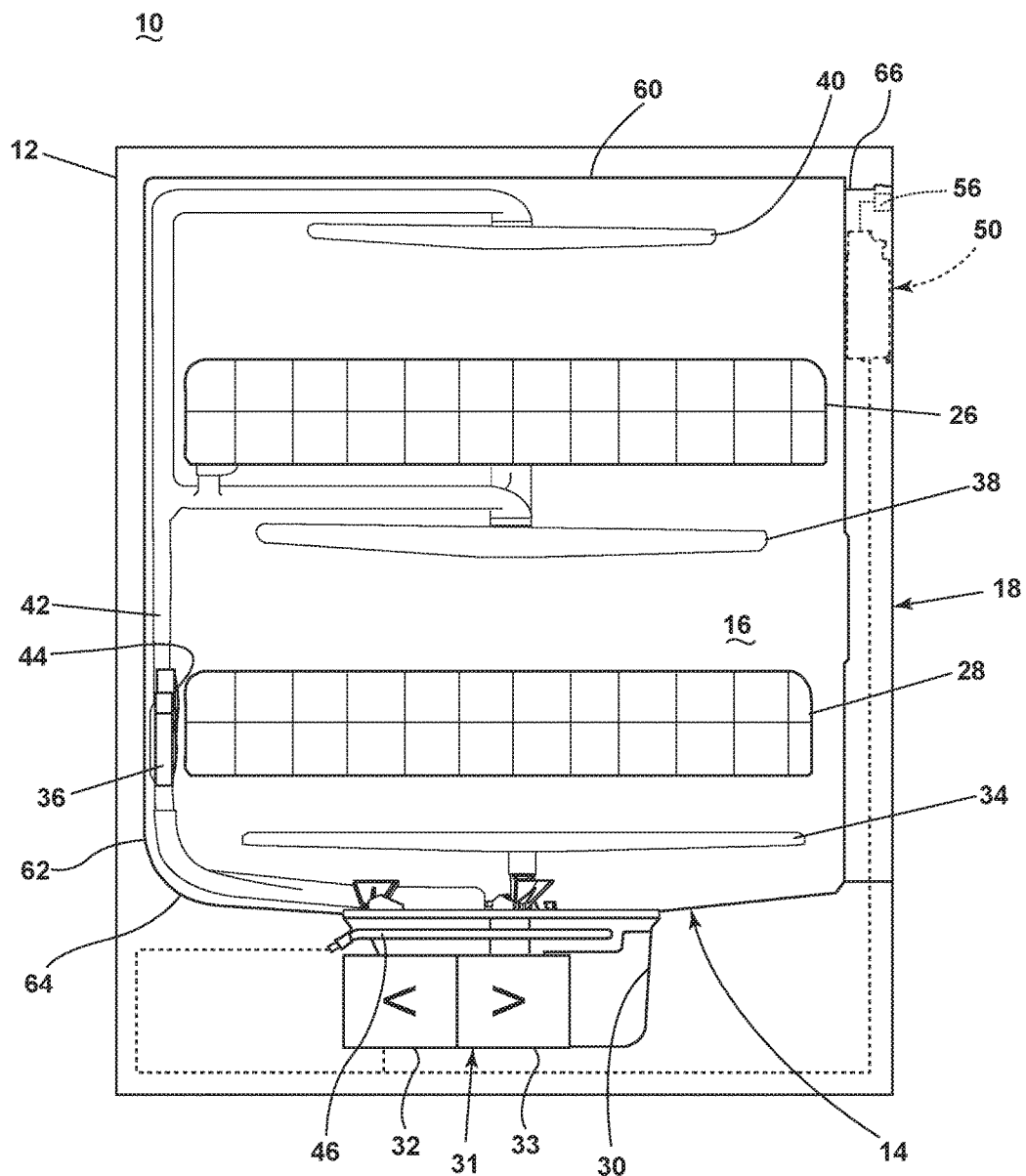
FIG. 1 is a schematic, cross-sectional view of a dishwasher according to a first embodiment of the invention.

In FIG. 1, an automated dishwasher 10 according to a first embodiment is illustrated. The dishwasher 10 shares many features of a conventional automated dishwasher, which will not be described in detail herein except as necessary for a complete understanding of the invention. A chassis 12 may define an interior of the dishwasher 10 and may include a frame, with or without panels mounted to the frame. An open-faced tub 14 may be provided within the chassis 12 and may at least partially define a treating chamber 16, having an open face, for washing dishes. A door assembly 18 may be movably mounted to the dishwasher 10 for movement between opened and closed positions to selectively open and close the open face of the tub 14. Thus, the door assembly provides accessibility to the treating chamber 16 for the loading and unloading of dishes or other washable items.

It should be appreciated that the door assembly 18 may be secured to the lower front edge of the chassis 12 or to the lower front edge of the tub 14 via a hinge assembly (not shown) configured to pivot the door assembly 18. When the door assembly 18 is closed, user access to the treating chamber 16 may be prevented, whereas user access to the treating chamber 16 may be permitted when the door assembly 18 is open.

Dish holders, illustrated in the form of upper and lower dish racks 26, 28, are located within the treating chamber 16 and receive dishes for washing. The upper and lower racks 26, 28 are typically mounted for slidable movement in and out of the treating chamber 16 for ease of loading and unloading. Other dish holders may be provided, such as a silverware basket. As used in this description, the term "dish(es)" is intended to be generic to any item, single or plural, that may be treated in the dishwasher 10, including, without limitation, dishes, plates, pots, bowls, pans, glassware, and silverware.

A spray system is provided for spraying liquid in the treating chamber 16 and is provided in the form of a first lower spray assembly 34, a second lower spray assembly 36, a rotating mid-level spray arm assembly 38, and/or an upper spray arm assembly 40. Upper spray arm assembly 40, mid-level spray arm assembly 38 and lower spray assembly 34 are located, respectively, above the upper rack 26, beneath the upper rack 26, and beneath the lower rack 24 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44. Such a spray manifold is set forth in detail in U.S. Pat. No. 7,594,513, issued Sep. 29, 2009, and titled "Multiple Wash Zone Dishwasher," which is incorporated herein by reference in its entirety.

A recirculation system is provided for recirculating liquid from the treating chamber 16 to the spray system. The recirculation system may include a sump 30 and a pump assembly 31. The sump 30 collects the liquid sprayed in the treating chamber 16 and may be formed by a sloped or recessed portion of a bottom wall of the tub 14. The pump assembly 31 may include both a drain pump assembly 32 and a recirculation pump assembly 33. The drain pump assembly 32 may draw liquid from the sump 30 and pump the liquid out of the dishwasher 10 to a household drain line (not shown). The recirculation pump assembly 33 may draw liquid from the sump 30 and the liquid may be simultaneously or selectively pumped through a supply tube 42 to each of the assemblies 34, 36, 38, 40 for selective spraying. While not shown, a liquid supply system may include a water supply conduit coupled with a household water supply for supplying water to the treating chamber 16.

A heating system including a heater 46 may be located within the sump 30 for heating the liquid contained in the sump 30.

A controller 50 may also be included in the dishwasher 10, which may be operably coupled with various components of the dishwasher 10 to implement a cycle of operation. The controller 50 may be located within the door 18 as illustrated, or it may alternatively be located somewhere within the chassis 12. The controller 50 may also be operably coupled with a control panel or user interface 56 for receiving user-selected inputs and communicating information to the user. The user interface 56 may include operational controls such as dials, lights, switches, and displays enabling a user to input commands, such as a cycle of operation, to the controller 50 and receive information.

Figure 2:
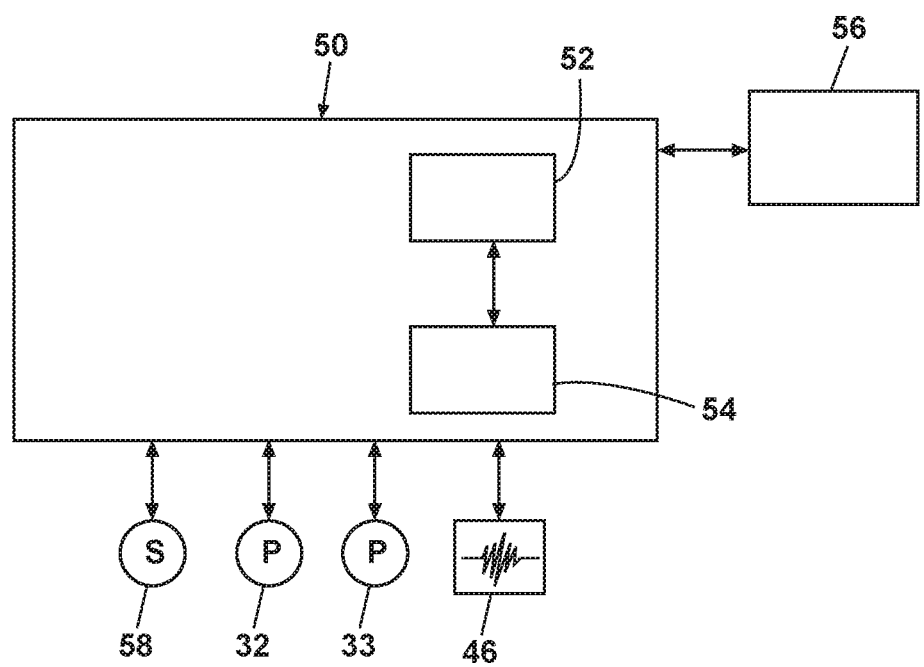
FIG. 2 is a schematic view of a controller of the dishwasher of FIG. 1.

As illustrated schematically in FIG. 2, the controller 50 may be coupled with the heater 46 for heating the wash liquid during a cycle of operation, the drain pump assembly 32 for draining liquid from the treating chamber 16, and the recirculation pump assembly 33 for recirculating the wash liquid during the cycle of operation. The controller 50 may be provided with a memory 52 and a central processing unit (CPU) 54. The memory 52 may be used for storing control software that may be executed by the CPU 54 in completing a cycle of operation using the dishwasher 10 and any additional software. For example, the memory 52 may store one or more pre-programmed cycles of operation that may be selected by a user and completed by the dishwasher 10. The controller 50 may also receive input from one or more sensors 58. Non-limiting examples of sensors that may be communicably coupled with the controller 50 include a temperature sensor and turbidity sensor to determine the soil load associated with a selected grouping of dishes, such as the dishes associated with a particular area of the treating chamber.

Figure 3:
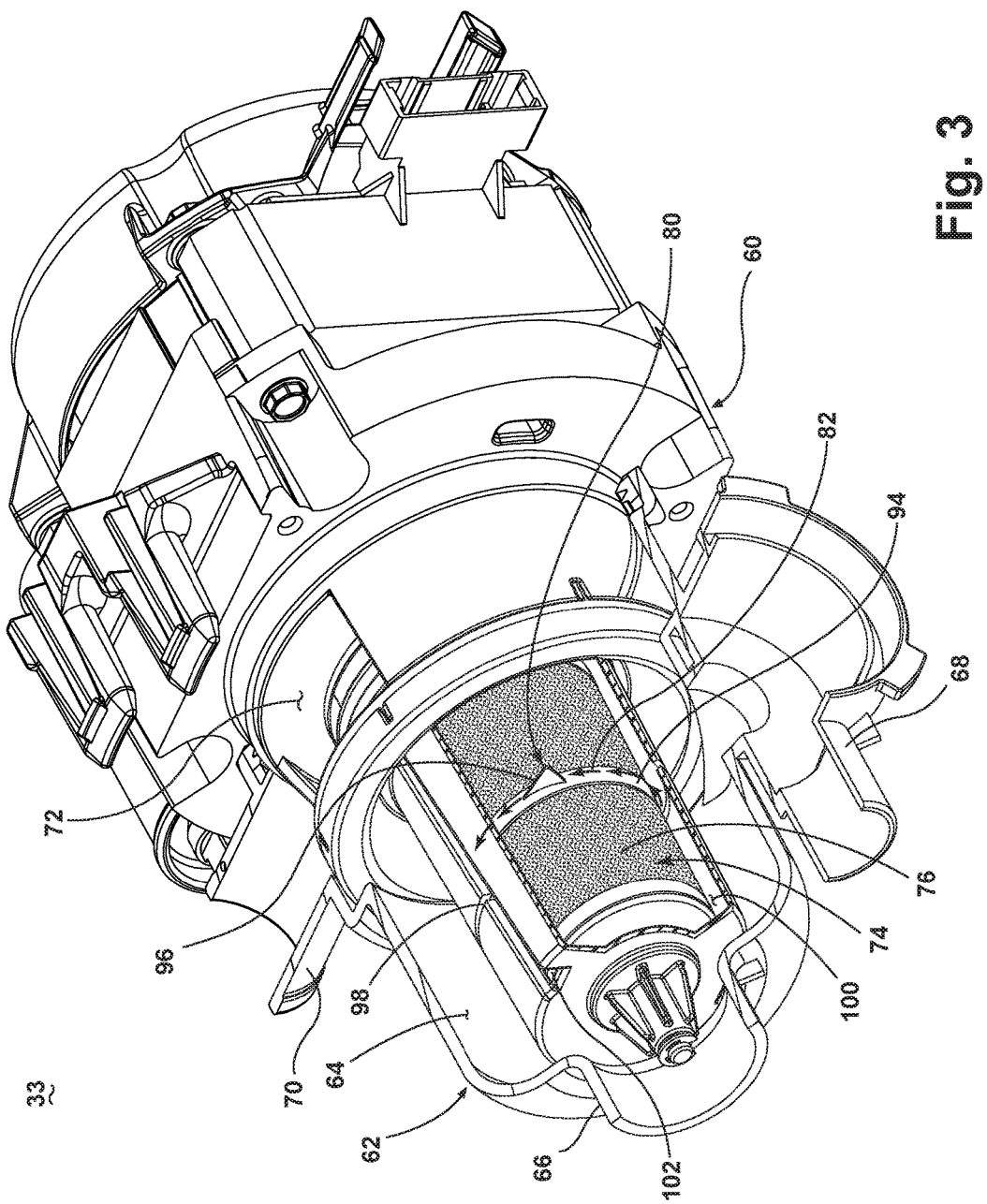
FIG. 3 is a perspective view of an embodiment of a pump, filter assembly, and chopping system of the dishwasher of FIG. 1 with portions cut away for clarity.

Referring now to FIG. 3, the recirculation pump assembly 33 is shown removed from the dishwasher 10. The recirculation pump assembly 33 includes a recirculation pump 60 that is secured to a housing 62, which is shown partially cutaway for clarity. The housing 62 defines a filter chamber 64 that extends the length of the housing 62 and includes an inlet port 66, a drain outlet port 68, and a recirculation outlet port 70. The inlet port 66 is configured to be coupled to a fluid hose (not shown) extending from the sump 30. The filter chamber 64, depending on the location of the recirculation pump assembly 33, may functionally be part of the sump 30 or replace the sump 30. The drain outlet port 68 for the recirculation pump 60, which may also be considered the drain pump inlet port, may be coupled to the drain pump assembly 32 such that actuation of the drain pump assembly 32 drains the liquid and any foreign objects within the filter chamber 64. The recirculation outlet port 70 is configured to receive a fluid hose (not shown) such that the recirculation outlet port 70 may be fluidly coupled to the liquid spraying system including the assemblies 34, 36, 38, 40. The recirculation outlet port 70 is fluidly coupled to an impeller chamber 72 of the recirculation pump 60 such that when the recirculation pump 60 is operated liquid may be supplied to each of the assemblies 34, 36, 38, 40 for selective spraying. In this manner, the recirculation pump 60 includes an inlet fluidly coupled to the tub 14 and an outlet fluidly coupled to the liquid spraying system to recirculate liquid from the tub 14 to the treating chamber 16.

A liquid filtering system is illustrated as including a rotating filter 74 and a soil chopping system is illustrated as including a blade 80 mounted to the rotating filter 74 for co-rotation therewith. The blade may be formed of any suitable material including stainless steel, plastic, ceramic, or a metal alloy. The blade 80 may define a blade path 82, schematically illustrated with arrows, upon rotation of the rotating filter 74. While only a single blade 80 has been illustrated it is contemplated that multiple blades may be included in a manner such that they form the same blade path 82 with rotation of the rotating filter 74.

Figure 4:
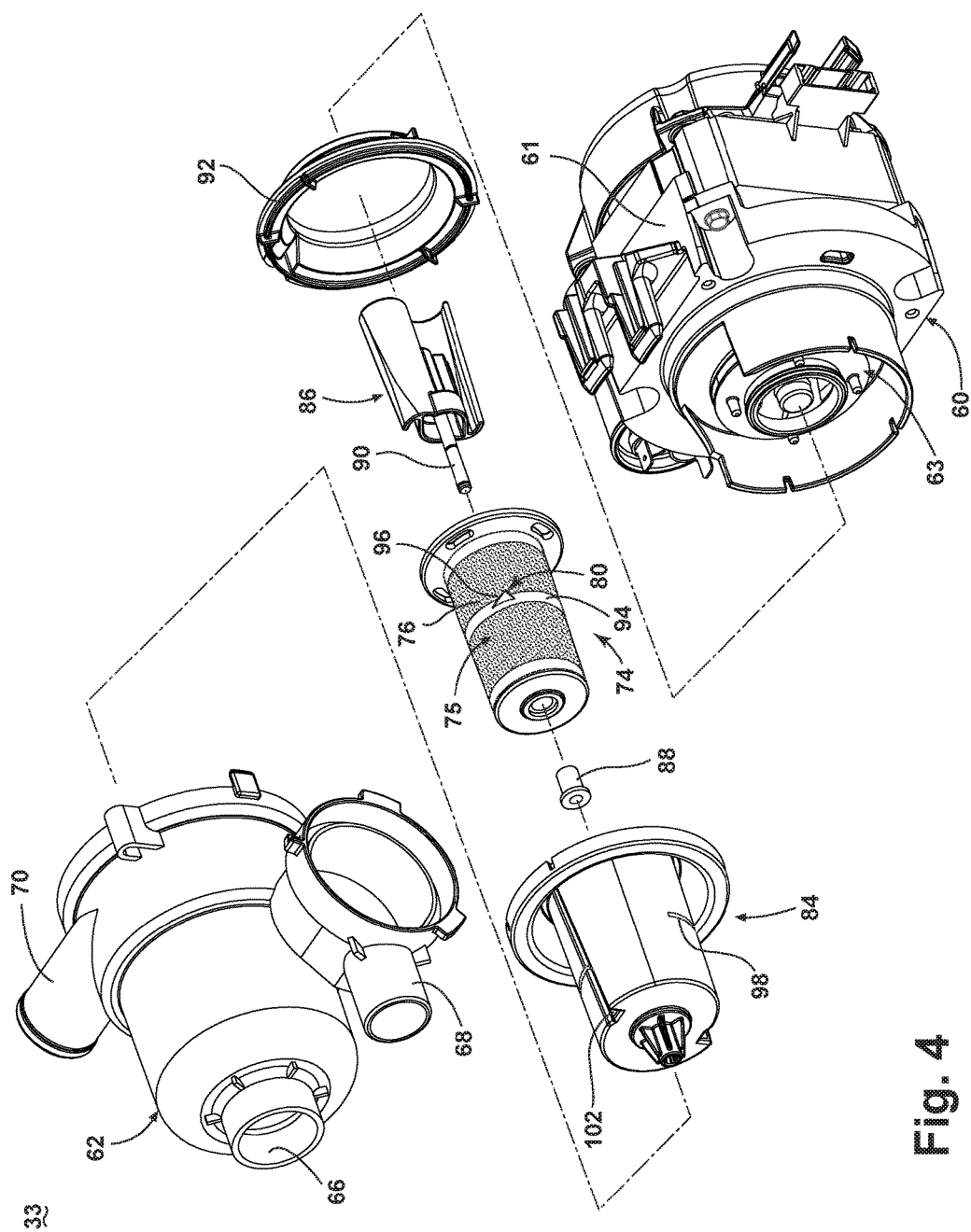
FIG. 4 is an exploded view of the pump, filter assembly, and chopping system of FIG. 2.

FIG. 4 more clearly illustrates that the recirculation pump assembly 33 may include a recirculation pump 60 having a motor 61 and an impeller 63, which may be rotatably driven by the motor 61. A shroud 84, the rotating filter 74, an internal flow diverter 86, a bearing 88, a shaft 90, and a separator ring 92 may be included in the recirculation pump assembly 33. The general details of such a recirculation pump assembly 33, rotating filter 74, shroud 84, and internal flow diverter 86 are described in the commonly-owned patent application entitled, Rotating Filter for a Dishwashing Machine, filed Jun. 20, 2011, and assigned U.S. application Ser. No. 13/163,945, now U.S. Pat. No. 8,627,832, which is incorporated by reference herein. It is contemplated that the soil chopping system having the at least one blade 80 may be used with any type of recirculation pump assembly having a rotating filter and that the recirculation pump assembly, rotating filter 74, shroud 84, and internal flow divert 86 described herein are merely for exemplary purposes and to provide the necessary details for implementing the illustrated embodiment.

The rotating filter 74 may be located within the recirculation flow path and may be operably coupled to the impeller 63 such that rotation of the impeller 63 effects the rotation of the rotating filter 74. The rotating filter 74 may include a filter sheet 75 having perforations to allow liquid to go from an upstream surface 76 to a downstream surface 78 to effect a filtering of the sprayed liquid in the recirculation flow path. The rotating filter 74 may also include a non-perforated portion 94. The non-perforated portion 94 may encircle the rotating filter 74 and may act as a strengthening rib. The non-perforated portion 94 may be for any given surface area and may provide the rotating filter 74 with greater strength, especially hoop strength. It is also contemplated that the perforations of the filter sheet 75 may be arranged to leave non-perforated bands encircling the filter sheet 75 with the non-perforated bands functioning as strengthening ribs. In the illustrated embodiment the blade 80 is mounted to the non-perforated portion 94. Alternatively, the blade 80 may be mounted to a perforated portion of the filter sheet 75. The blade 80 may be mounted to the rotating filter 74 in any suitable manner.

Regardless of whether the blade 80 is mounted to a perforated or non-perforated portion, the blade 80 may project outwardly from the rotating filter 74 such that it extends radially from the upstream surface 76. A leading edge 96 of the blade 80 may be oriented with respect to the rotating filter 74 at a variety of angles resulting in different maceration action of foreign objects in the blade path 82. More specifically, the blade 80 may be angled such that it is more tangent to the rotating filter 74 resulting in a greater slicing action than if the blade 80 were angled more perpendicular to the rotating filter 74, which would result in more of a chopping action for the expected flow direction. The angle of the leading edge 96 of the blade 80 may also be at any angle between perpendicular and tangent to the upstream surface 76 to allow for some variation of both the slicing and chopping actions. The leading edge 96 may be oriented such that impact forces that could damage the blade 80 and/or the rotating filter 74 or cause the rotating filter 74 to get jammed may be reduced.

Figure 5:
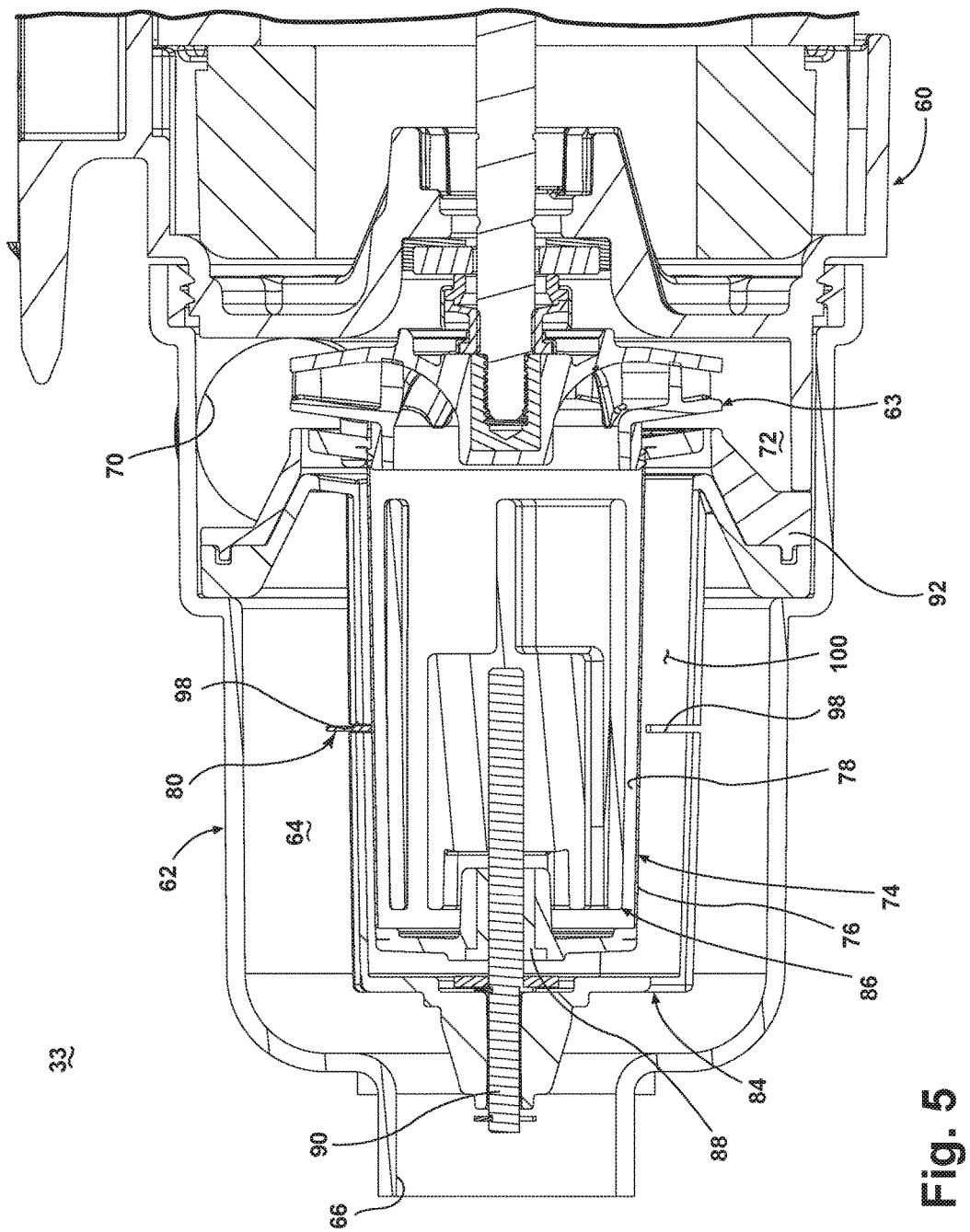
FIG. 5 is a cross-sectional view of the pump, filter assembly, and chopping system of FIG. 2 taken along the line 5-5 shown in FIG. 3.

It will be understood that the shroud 84 forms an artificial boundary and that no portion of the shroud 84 lies within the blade path 82. In the illustrated example, the shroud 84 includes a slot 98 through at least a portion of the shroud 84. More specifically, the slot 98 runs through a circumferential portion of the shroud 84. In the illustrated embodiment, the shroud 84 defines an interior 100 (FIG. 5), within which the rotating filter 74 may be located and which is fluidly accessible through multiple inlet openings 102. It is contemplated that the shroud 84 may include any number of inlet openings 102 including a singular inlet opening. As the spacing of the shroud 84 relative to the filter 74 varies radially, and is at some locations greater than the height of the blade 80, it is not necessary for the slot 98 to extend completely around the shroud. Instead, the slot 98 is located only at the positions where the blade 80 would otherwise contact the shroud 84.

When assembled, the bearing 88 may be mounted in an end of the rotating filter 74 and may rotatably receive the stationary shaft 90, which in turn may be mounted to an end of the stationary shroud 84. In this way, the rotating filter 74 may be rotatably mounted to the stationary shaft 90 with the bearing 88. The internal flow diverter 86 may also be mounted on the stationary shaft 90. The stationary shroud 84 may be mounted at its other end to the separator ring 92, which in turn is attached to the recirculation pump 60. Thus, the shroud 84 and internal flow diverter 86 are stationary while the rotating filter 74 and its attached blade 80 are free to rotate about the stationary shaft 90 in response to rotation of the impeller 63. The filter chamber 64 envelopes the shroud 84, the rotating filter 74, and the chopping system with the blade 80.

In operation, wash liquid, such as water and/or treating chemistry (i.e., water and/or detergents, enzymes, surfactants, and other cleaning or conditioning chemistry), enters the tub 14 and flows into the sump 30 to the inlet port 66 where the liquid may enter the filter chamber 64. As the filter chamber 64 fills, liquid passes through the perforations in the rotating filter 74. After the filter chamber 64 is completely filled and the sump 30 is partially filled with liquid, the dishwasher 10 activates the motor 61. During an operation cycle, a mixture of liquid and foreign objects such as soil particles may advance from the sump 30 into the filter chamber 64 to fill the filter chamber 64.

Activation of the motor 61 causes the impeller 63, the rotating filter 74, and the blade 80 to rotate. The liquid in the recirculation flow path flows into the filter chamber 64 from the inlet port 66. The rotation of the filter 74 causes the liquid and soils therein to rotate in the same direction within the filter chamber 64. The recirculation flow path may circumscribe at least a portion of the shroud 84 and enters through inlet openings 102 therein. The rotation of the impeller 63 draws liquid from the filter chamber 64 and forces the liquid by rotation of the impeller 63 outward such that it is advanced out of the impeller chamber 72 through the recirculation outlet port 70 to the assemblies 34, 36, 38, 40 for selective spraying. When liquid is delivered to the assemblies 34, 36, 38, 40, it is expelled from the assemblies 34, 36, 38, 40 onto any dishes positioned in the treating chamber 16. Liquid removes soil particles located on the dishes, and the mixture of liquid and soil particles falls onto the bottom wall of the tub 14. The sloped configuration of the bottom wall of the tub 14 directs that mixture into the sump 30. The recirculation pump 60 is fluidly coupled downstream of the downstream surface 78 of the rotating filter 74 and if the recirculation pump 60 is shut off then any liquid and soils within the filter chamber will settle in the filter chamber 64 where the liquid and any soils may be subsequently drained by the drain pump assembly 32.

Figure 6:
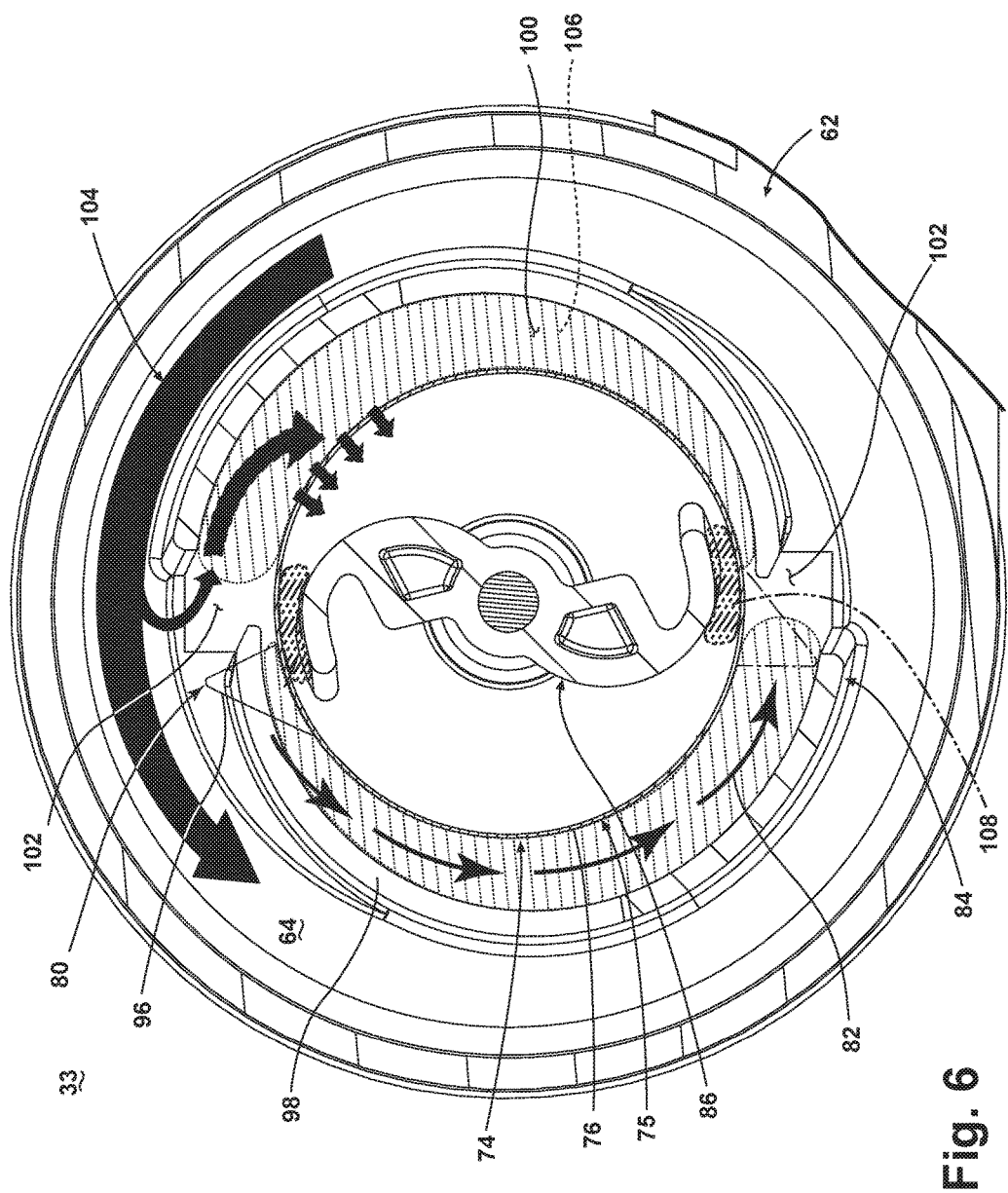
FIG. 6 is a cross-sectional elevation view of a portion of the pump, filter assembly, and chopping system of FIG. 2.

FIG. 6 illustrates more clearly the shroud 84, the internal flow diverter 86, the flow of the liquid along the recirculation flow path, and the movement of the blade 80. Multiple arrows 104 illustrate the travel of liquid along the recirculation flow path as it passes through the rotating filter 74 from the upstream surface 76 to the downstream surface 78. Several of the zones created in the filter chamber 64 during operation have also been illustrated and include: a first shear force zone 106 and a second shear force zone 108. These zones impact the travel of the liquid along the liquid recirculation flow path as described in detail in the U.S. Pat. No. 7,594,513. It will be understood that the shroud 84 forms a first artificial boundary spaced from the upstream surface 76 of the rotating filter 74 such that liquid passing between the shroud 84 and the upstream surface 76 applies a greater shear force on the upstream surface 76 than liquid in an absence of the shroud 84 and that in this manner the first shear force zone 106 is formed. Similarly the internal flow diverter 86 forms a second artificial boundary spaced from the downstream surface 78 of the rotating filter 74 and creates the second shear force zone 108. The first and second shear force zones 106 and 108 aid in removing foreign soil from the rotating filter 74. Additional zones may be formed by the shroud 84 and the internal flow diverter 86 as described in detail in the U.S. Pat. No. 7,594,513.

As illustrated, the rotating filter 74 is cylindrical and as such the blade path 82 formed by the blade 80 upon rotation of the rotating filter 74 is circular. When the blade 80 is rotated, the blade 80 may act to macerate any foreign objects within the filter chamber 64 that it comes into contact with. As illustrated, the distance between the shroud 84 and the upstream surface 76 may vary; the presence of the slot 98 allows for free rotation of the blade 80 where the shroud 84 is closer to the upstream surface 76. More specifically, the slot 98 is located in the narrower portions of the shroud 84 to allow for clearance of the blade 80 as it rotates through these narrow portions and will not contact the shroud 84. It will be understood that at some points, the blade 80 may extend through the slot 98 and be capable of macerating foreign objects both inside and outside the shroud 84. As the blade 80 moves along the blade path 82 it may travel through the slot 98 and as the spacing between the shroud 84 and the rotating filter 74 increases the blade 80 may move along the blade path 82 entirely within the interior 100 of the shroud 84. The spacing between the blade 80 and the shroud 84 are such that the spacing allows the blade 80 to adequately chop or macerate foreign objects without having foreign objects become trapped between the blade 80 and the shroud 84.

Figure 7:
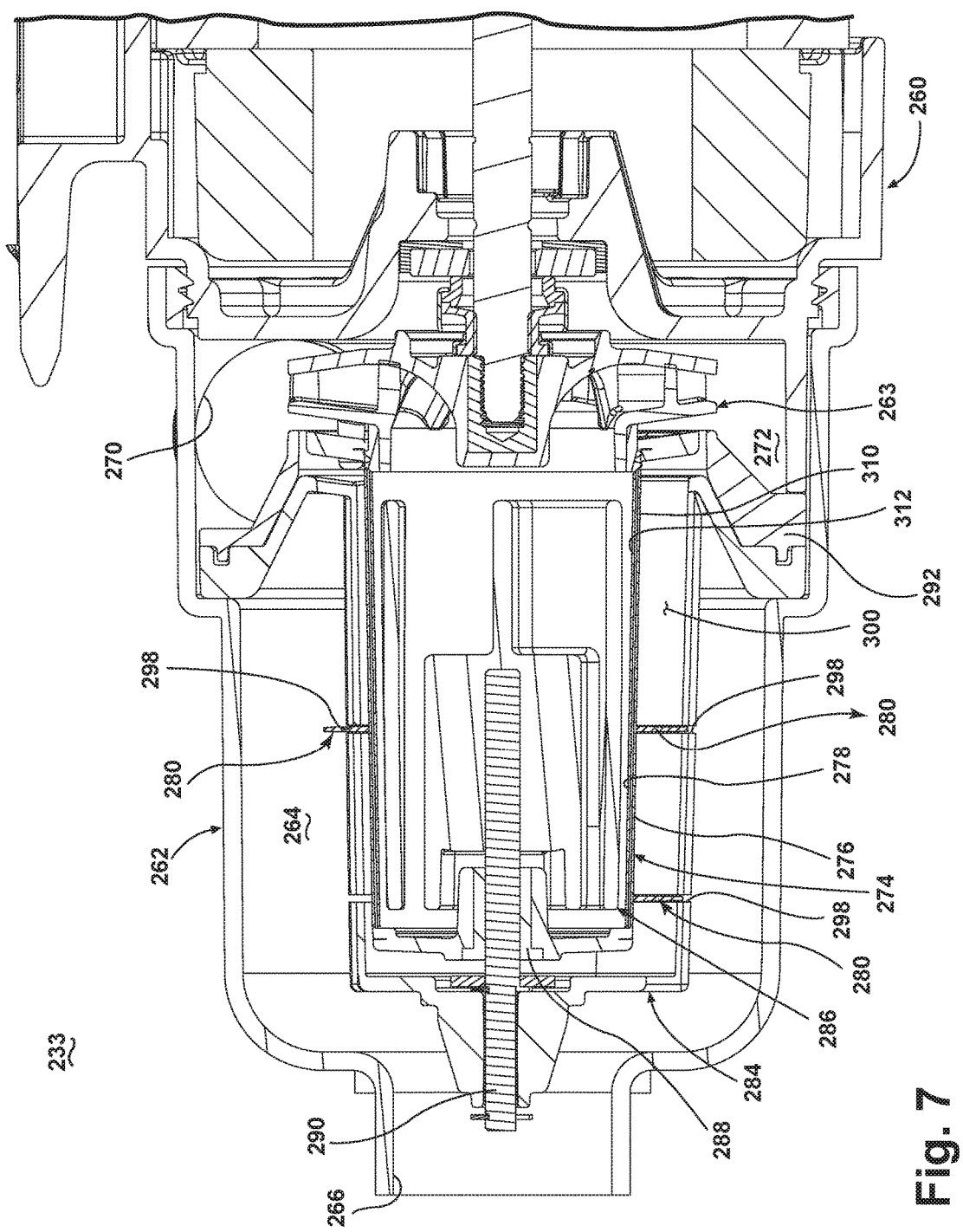
FIG. 7 is a cross-sectional view of a pump, filter assembly, and chopping system according to a second embodiment of the invention.

FIG. 7 illustrates a recirculation pump assembly 233, which includes a chopping system according to a second embodiment of the invention. The second embodiment is similar to the first embodiment; therefore, like parts will be identified with like numerals increased by 200, with it being understood that the description of the like parts of the first embodiment applies to the second embodiment, unless otherwise noted. The chopping system in the second embodiment includes multiple blades 280. Two of the multiple blades 280 are oriented with each other such that they may form a single blade path while a third of the multiple blades 280 are oriented to form an additional blade path such that multiple blade paths (not shown) are formed upon rotation of the rotating filter 274.

Another difference is that the rotating filter 274 has been illustrated as including a first filter element 310 forming the upstream surface 276 and a second filter element 312 forming the downstream surface 278 and the multiple blades 280 are mounted to the first filter element 310 and extend outwardly therefrom. The first filter element 310 and the second filter element 312 may be affixed to each other or may be spaced apart from each other by a gap. By way of non-limiting example, the first filter element 310 has been illustrated as a cylinder and the second filter element 312 has been illustrated as a cylinder received within the first filter element 310. The first filter element 310 and second filter element 312 may be structurally different from each other, may be made of different materials, and may have different properties attributable to them. For example, the first filter element 310 may be a courser filter than the second filter element 312. Both the first and second filter elements 310, 312 may be perforated and the perforations of the first filter element 310 may be different from the perforations of the second filter element 312, with the size of the perforations providing the difference in filtering. It is contemplated that the first filter element 310 may be more resistant to foreign object damage than the second filter element 312. The resistance to foreign object damage may be provided in a variety of different ways. The first filter element 310 may be made from a different or stronger material than the second filter element 312. The first filter element 310 may be made from the same material as the second filter element 312, but having a greater thickness. The distribution of the perforations may also contribute to the first filter element 310 being stronger. The perforations of the first filter element 310 may leave a more non-perforated area for a given surface area than the second filter element 312, which may provide the first filter element 310 with greater strength, especially hoop strength. It is also contemplated that the perforations of the first filter element 310 may be arranged to leave non-perforated bands encircling the first filter element 310, with the non-perforated bands functioning as strengthening ribs.

It will be understood that any features of the above described embodiments may be combined in any manner. Further, while a specific example of a shroud and internal flow diverter have been shown and described, any suitable artificial boundaries may be used with the chopping systems described in the above embodiments. Alternatively, no artificial boundaries may be included. It is also contemplate d that the height and shape of the blades may be changed such that they will not interfere with any such artificial boundaries. Slots may be shaped to allow for the location and rotation of the blades or the artificial boundaries themselves may be configured such that no slots are necessary. For example, the contour of the artificial boundary or shroud may be such that the blade path would not interfere with the artificial boundary.

The embodiments described above provide for a variety of benefits including that the blades may create a slicing or chopping action that may reduce the occurrence of foreign objects that may damage the rotating filter or pump assemblies. Further, the embodiments described above allow for enhanced filtration such that soil is filtered from the liquid and not re-deposited on dishes and allow for cleaning of the rotating filter throughout the life of the dishwasher and this maximizes the performance of the dishwasher. Thus, such embodiments require less user maintenance than required by typical dishwashers.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dishwasher for treating dishes according to at least one cycle of operation, comprising:
   a tub at least partially defining a treating chamber;
   a liquid spraying system supplying a spray of liquid to the treating chamber;
   a liquid recirculation system including a recirculation pump having an impeller and recirculating the sprayed liquid from the treating chamber to the liquid spraying system to define a recirculation flow path;
   a liquid filtering system, comprising:
      a housing defining a filter chamber that extends a length of the housing;
      a hollow rotating filter, with the hollow rotating filter having an outer surface and an inner surface defining a hollow interior and where the hollow rotating filter is located within the housing such that the sprayed liquid within the housing passes through the hollow rotating filter from the outer surface into the hollow interior to effect a filtering of the sprayed liquid and where the hollow rotating filter fluidly divides the filter chamber into a first part that contains filtered soil particles and a second part within the hollow interior that excludes the filtered soil particles; and
   a soil chopping system comprising at least one blade mounted to the outer surface of the hollow rotating filter for co-rotation therewith, the at least one blade extending from the outer surface and defining a blade path upon rotation of the hollow rotating filter that is about the outer surface.

2. The dishwasher of claim 1 wherein the housing is remote from the tub such that the hollow rotating filter is inaccessible to a user.

3. The dishwasher of claim 1 wherein the hollow rotating filter includes at least one non-perforated portion and the at least one blade is mounted to the non-perforated portion.

4. The dishwasher of claim 3 wherein the non-perforated portion extends along the hollow rotating filter and forms a strengthening rib.

5. The dishwasher of claim 1 wherein the hollow rotating filter is operably coupled to the impeller such that rotation of the impeller effects the rotation of the hollow rotating filter.

6. The dishwasher of claim 5, further comprising a first artificial boundary in the form of a shroud spaced from the outer surface of the hollow rotating filter such that liquid passing between the first artificial boundary and the outer surface applies a greater shear force on the outer surface than liquid in an absence of the first artificial boundary and wherein no portion of the first artificial boundary lies within the blade path.

7. The dishwasher of claim 6, further comprising a second artificial boundary spaced from the inner surface of the hollow rotating filter such that liquid passing between the second artificial boundary and the inner surface applies a greater shear force on the inner surface than liquid in an absence of the second artificial boundary.

8. The dishwasher of claim 1 wherein the at least one blade has a leading edge that is tangential to the outer surface of the hollow rotating filter.

9. The dishwasher of claim 1 wherein the at least one blade includes multiple blades.

10. The dishwasher of claim 9 wherein the multiple blades form a single blade path.

11. A dishwasher for treating dishes according to at least one cycle of operation, comprising:
   a tub at least partially defining a treating chamber;
   a liquid spraying system supplying a spray of liquid to the treating chamber;
   a liquid recirculation system recirculating the sprayed liquid from the treating chamber to the liquid spraying system to define a recirculation flow path; and
   a liquid filtering system comprising:
      a housing defining a filter chamber that extends a length of the housing;

a hollow rotating filter having a filter sheet with an outer surface and an inner surface defining a hollow interior and located within the housing such that the sprayed liquid in the housing passes through the hollow rotating filter from the outer surface into the hollow interior to effect a filtering of the sprayed liquid such that the hollow rotating filter fluidly divides the filter chamber into a first part that contains filtered soil particles and a second part within the hollow interior that excludes the filtered soil particles; and a first artificial boundary spaced from at least one of the outer surface or the inner surface such that liquid passing between the first artificial boundary and the at least one of the outer surface or the inner surface applies a greater shear force on the at least one of the outer surface or the inner surface that liquid in an absence of the first artificial boundary; and a soil chopping system comprising at least one blade mounted to the outer surface of the hollow rotating filter for co-rotation therewith, the at least one blade extending from the outer surface and defining a blade path upon rotation of the hollow rotating filter that is about the outer surface of the hollow rotating filter.

12. The dishwasher of claim 11 wherein the hollow rotating filter is operably coupled to a pump impeller such that rotation of the impeller effects the rotation of the hollow rotating filter.

13. The dishwasher of claim 11 wherein the first artificial boundary is spaced from the outer surface and no portion of the first artificial boundary lies within the blade path.

14. The dishwasher of claim 13 wherein the first artificial boundary is a shroud defining a shroud interior within which the hollow rotating filter is located and where the shroud comprises a slot through at least a portion of the shroud so that no portion of the first artificial boundary lies within the blade path.

15. The dishwasher of claim 14, further comprising a second artificial boundary located adjacent a portion of the inner surface such that liquid passing between the second artificial boundary and the inner surface applies a greater shear force on the inner surface than liquid in an absence of the second artificial boundary.

16. The dishwasher of claim 11 wherein the at least one blade includes multiple blades.

17. The dishwasher of claim 16 where the multiple blades form at least two separate blade paths.

18. The dishwasher of claim 11 wherein the housing is remote from the tub such that the hollow rotating filter is inaccessible to a user.

19. A dishwasher for treating dishes according to at least one cycle of operation, comprising:
a tub at least partially defining a treating chamber;
a liquid spraying system supplying a spray of liquid to the treating chamber;
a liquid recirculation system recirculating the sprayed liquid from the treating chamber to the liquid spraying system to define a recirculation flow path; and
a liquid filtering system comprising:
a hollow rotating filter having an outer surface and an inner surface defining a hollow interior and where the sprayed liquid passes through the hollow rotating filter from the outer surface into the hollow interior to effect a filtering of the sprayed liquid such that the hollow rotating filter fluidly divides the sprayed liquid into a first part that contains filtered soil particles and a second part within the hollow interior that excludes the filtered soil particles;
a first artificial boundary spaced from the outer surface such that liquid passing between the first artificial boundary and the outer surface applies a greater shear force on the outer surface than liquid in an absence of the first artificial boundary;
a second artificial boundary spaced from the inner surface such that liquid passing between the second artificial boundary and the inner surface applies a greater shear force on the inner surface than liquid in an absence of the second artificial boundary; and
a soil chopping system comprising at least one blade mounted to the hollow rotating filter for co-rotation therewith, the at least one blade extending radially from the hollow rotating filter and defining a blade path upon rotation of the hollow rotating filter that is about the hollow rotating filter.

20. The dishwasher of claim 19 wherein the at least one blade includes multiple blades and the multiple blades form at least two separate blade paths.

* * * * *